US006368034B1

(12) United States Patent
Frye

(10) Patent No.: US 6,368,034 B1
(45) Date of Patent: Apr. 9, 2002

(54) MULTI-USE TRAILER FOR TRANSPORTING GOLF CARTS AND THE LIKE

(75) Inventor: Jack F. Frye, Belmont, NC (US)

(73) Assignee: Innovative Transportation Service, Inc., Charlotte, NC (US)

(*) Notice: Subject to any disclaimer, the term of this patent is extended or adjusted under 35 U.S.C. 154(b) by 0 days.

(21) Appl. No.: 09/470,072

(22) Filed: Dec. 22, 1999

(51) Int. Cl.$^7$ ................................................. B60P 7/08
(52) U.S. Cl. ............................... 410/26; 410/14; 410/24
(58) Field of Search ............................... 410/3, 14, 24, 410/26, 29.1; 105/375

(56) References Cited

U.S. PATENT DOCUMENTS

| | | | |
|---|---|---|---|
| 2,461,927 A | * 2/1949 | Schaldach et al. | 410/26 |
| 4,701,086 A | * 10/1987 | Thorndyke | 410/26 |
| 4,738,575 A | * 4/1988 | Blodgett et al. | 410/264 |
| 4,759,668 A | * 7/1988 | Larsen et al. | 410/26 |
| 4,801,229 A | * 1/1989 | Hanada et al. | 410/26 |
| 4,966,510 A | * 10/1990 | Johnson, Jr. | 410/26 |
| 5,051,046 A | * 9/1991 | Oren | 410/29.1 |

* cited by examiner

Primary Examiner—Stephen T. Gordon
(74) Attorney, Agent, or Firm—Kennedy Covington Lobdell & Hickman, LLP

(57) ABSTRACT

An apparatus configurable to simultaneously transport golf carts and the like and conventional-type loads on a wheeled vehicle during over-the-road travel includes a substantially enclosed compartment, an intermediate support shelf disposed interiorly of and extending a portion of the length of the compartment for relative movement therein and an apparatus for selectively moving the intermediate support shelf between a first position for supporting a first plurality of golf carts and the like thereon for transport thereof at a predetermined height above the floor of the compact to permit the simultaneous transport of the second plurality of golf carts and the like disposed on the floor, a second position in which the intermediate support shelf is in substantially flush relation with the boundaries of the interior of the compartment and a third position in which the support shelf extends upwardly from the floor of the compartment to a predetermined height above the floor. A mounting assembly is provided for movably connecting the shelf to extend across a portion of the compartment for movement of the shelf between the first, second and third positions and an adjustment device is provided for maintaining the alignment of the intermediate support shelf. Pivoted ramps are provided for selective positioning to load and unload the golf cars and the like from the road into and out of the over-the-road vehicle.

8 Claims, 6 Drawing Sheets

MULTI-USE TRAILER FOR TRANSPORTING GOLF CARTS AND THE LIKE

BACKGROUND OF THE INVENTION

The present invention relates to an apparatus for supporting loads for transport by a wheeled vehicle during over-the-road travel and, more particularly, to an apparatus configurable to support different types of loads on a wheeled vehicle during over-the-road travel.

Tractor-trailer combinations, commonly known as semi-trailers, are well known for transporting loads over-the-road and have been available for many years. The trailer includes an elongate box-like load supporting compartment mounted on a wheeled chassis, the wheeled chassis being connected in an articulated manner to a self-propelled tractor. One typical version of the tractor-trailer combination includes an enclosed, box-like compartment for hauling conventional loads. Another version of the tractor-trailer combination basically includes a load supporting compartment defined within a metal framework with the load being substantially open to the elements. Common examples of this version of the tractor-trailer combination are the various commercially available trailers for transporting automobiles which typically include a lower support surface for supporting one tier of automobiles and an upper support surface supported by the metal framework at a clearance above the first tier of automobiles for supporting a second tier of automobiles thereon, the upper support surface being accessible by hydraulically operated ramps which can be selectively inclined to provide a ramp for individually driving the automobiles onto the upper support surface.

Tractor-trailer combinations similar to the automobile tractor-trailer combinations have also been adapted for transport of specialized loads, such as self-propelled golf carts. Such golf cart trailers typically include an enclosed load supporting compartment and are basically configured similarly to the automobile metal framework trailers for providing the capability to load the golf carts thereon in rows and columns. However, the tractor-trailer combinations including such metal framework are not well-suited for transporting other types of loads which are commonly carried by the conventional box-like closed compartment type trailers. Thus, the versatility of the trailers adapted for transporting golf carts is limited because the trailer is not capable of hauling conventional loads when it is not being used for transporting golf carts. This limitation is particularly disadvantageous because golf carts are typically transported in one direction only such as, e.g., from the golf cart manufacturer to the buyer, and the trailer must make an empty or non-load transporting return trip instead of hauling conventional loads upon its return to its origin.

The present invention is specifically directed to a modification of the type of trailer generally described in my U.S. Pat. No. 4,966,510, entitled "Trailer for Transporting Golf arts and the Like" issued Oct. 30, 1990 which is an improvement over the prior art trailers for transporting golf carts and the like. Specifically, my U.S. Pat. No. 4,966,510 for supporting different types of loads on a wheeled vehicle during over-the-road travel includes a substantially enclosed compartment, an intermediate support shelf disposed interiorly of the compartment for relative movement therein and a control system for selectively moving the intermediate support shelf between a transport position for supporting a first plurality of golf carts and the like thereon for transport thereof and a storage position flush with the ceiling of the enclosed compartment. The support shelf extends substantially the entire length of the compartment and includes a front portion and a back portion interconnected to one another by a coupling device which permits movement of the front and back portions relative to one another. The control system includes a cable winch and a plurality of cables connected to the cable winch and to the shelf. The cable winch is operable to selectively wind and unwind the cables to effect movement of the shelf means. In use, the control system is operable to move the shelf to a loading position for loading the golf carts and the like thereon at which the front shelf portion is disposed intermediate the ceiling and the floor and generally parallel thereto, and the back shelf portion is disposed generally downwardly inclined from the front shelf portion toward the floor. Additionally, the control system is operable to move the shelf between a transport position for supporting golf carts and the like during transport thereof at which both the front and back shelf portions are disposed intermediate the ceiling and the floor and generally parallel thereto, and a storage position at which the front and back shelf portions are disposed in substantially flush relation with either the ceiling or the floor of the compartment.

My U.S. Pat. No. 4,966,510 also includes an auxiliary loading supporting structure for supporting at least one additional golf cart and the like in the clearance between the enclosed compartment and the road and includes a frame movably mounted to the over-the-road vehicle selectively movable between an inclined position for rolling the additional golf cart or the like between the road and the frame and a transport position in which the additional golf cart and the like is supported at a height sufficiently above the road for normal traveling operation of the over-the-road vehicle. In addition, pivoted ramps are provided for selective positioning to load and unload the golf cars and the like into the over-the-road vehicle.

While my U.S. Pat. No. 4,966,510 addresses many of the disadvantages of the prior art load transport apparatuses, one drawback is that the full capacity of the enclosed compartment of the trailer may not be used when hauling conventional type loads. Although the intermediate support shelf can moved to a storage position flush with the ceiling of the closed compartment when not transporting golf carts, my prior invention does not allow an operator to simultaneously use a portion of the enclosed compartment for transporting golf carts and use a remaining portion of the enclosed compartment for other purposes. Thus, an operator may not build out a portion of the trailer for hauling conventional-type loads while simultaneously transporting golf carts. Moreover, although the entire compartment is substantially empty when the intermediate shelf is moved to its storage position, the vertical capacity of entire compartment is reduced due to the space occupied by the support shelf stored adjacent to the ceiling of the compartment.

Therefore, there is a need for a tractor-trailer combination which provides for transporting golf carts in a portion of the trailer while allowing the use of the full capacity of another portion of the trailer for other purposes.

SUMMARY OF THE INVENTION

The present invention is directed to a multi-use trailer for transporting golf carts and the like in a vehicle of the type having a chassis and including a substantially enclosed compartment mounted on the vehicle chassis, an intermediate support disposed interiorly of the compartment and pivotably supported by a mounting means, and an arrangement for selectively moving the intermediate support means.

The intermediate support of the multi-use trailer is specifically designed to extend across only a portion of the length of the enclosed compartment for utilizing such portion for transporting golf carts and the like, while simultaneously reserving and making available the full capacity of the remaining portion of the compartment for other uses. Because the intermediate support does not extend across the full length of the compartment, the multi-use trailer of the present invention is less costly to construct and allows the operator to utilize the fall capacity of a portion of the compartment for hauling bulk materials or conventional-type loads while simultaneously transporting golf carts, vehicles or the like to their destination, and further provides the use of substantially the full capacity of the entire compartment on the return trip.

The substantially enclosed compartment of the present invention includes a pair of spaced apart, generally parallel side walls, each side wall having an upper and lower portion, the side wall upper portions supporting therebetween an overhead cover, and a floor positioned between the pair of side walls and connected to the wall lower portions. The side walls, the overhead cover and the floor define the boundaries of the interior of the substantially enclosed compartment. The intermediate support of the present invention includes a generally planar shelf disposed interiorly of the substantially enclosed compartment for supporting the golf carts. The support shelf extends through a portion of the length of the compartment and extends between the side walls and is connected thereto for movement relative thereto between: a first or transport position for supporting a first plurality of the golf carts and the like thereon for transport at a predetermined height between the floor and the ceiling and generally parallel thereto to permit the simultaneous transport of a second plurality of golf carts and the like disposed on the floor; a second or storage position in which the support shelf is disposed in substantially flush relation with the boundaries of the interior of the substantially enclosed compartment for providing access to substantially the entire interior volume of the substantially enclosed compartment; and a third or loading position in which the support shelf is disposed generally downwardly toward the floor of the compartment, inclined from a predetermined height above the floor.

The present invention includes an arrangement for selectively moving the support shelf between its transport, storage and loading positions. The arrangement preferably includes a cable winch and a plurality of cables connected to the cable winch and to the support shelf. The cable winch is operable to selectively wind and unwind the cables to effect movement of the support shelf. In addition, the present invention includes a selectively operable adjustment means arranged for adjusting the length of the cable to maintain alignment of support shelf for providing a level surface for the golf carts disposed on the shelf. Further, a selectively operable load bearing means is provided for supporting the support shelf and the golf carts and the like carried on the shelf when the shelf is in its transport position. The selectively operable loading bearing means is moveable between a first disposition for providing support and a second disposition at which it is clear from any movement of the shelf between the first, second and third positions. Preferably, the load bearing means is positioned on each side wall of the compartment and includes a plurality of brackets movable between a position in the second disposition in which they are substantially flush with the associated wall, and a support position in the first disposition in which they extend generally perpendicularly to the associated wall for supporting the support shelf thereon.

A feature of the present invention is a mounting means for securely connecting a front end of the support shelf to the side walls while allowing for selective movement of the support shelf between its transport, storage and loading positions. The mounting means of the present invention includes a shelf supporting means on each wall and a pivoting means in communication with the shelf supporting means. The pivoting means is positioned at the front end of the support shelf for connecting the shelf to the walls and providing for relative movement of the shelf about an axis generally transverse to the walls, whereby the shelf is movable between its loading or inclined position in which it is inclined downwardly from its front end toward its respective other end to permit travel thereover of the golf carts and the like during loading and unloading of the shelf, and a level position generally parallel to the floor and ceiling for the support thereon of the golf carts and the like in the first or transport position of the support shelf.

The pivoting means preferably includes a first member forming a nonrotatable axis of a second member which is rotatable relative to the first member and connected to the front end of the support shelf for rotating the shelf between its loading and transport positions. The first member is held by the shelf supporting means and is engaged by the cables to effect the movement of the front end of the support shelf between its transport and storage positions. The shelf supporting means includes an opening in each side wall adapted to receive the first member therein for holding the front end of the shelf in position. Preferably, the mounting means of the present invention also includes a stabilizing means for minimizing the movement of the front end of the support shelf while the vehicle is in motion.

In addition, the multi-use trailer of the present invention includes a ramp mounted on the vehicle, the ramp being movable between a storage position in which it is disposed for transport by the vehicle and a loading position in which it extends between the floor of the compartment and the road to provide an inclined surface for the travel therealong of the golf carts and the like from the road into said interior of the substantially enclosed compartment, and vice versa.

In one preferred embodiment, the present invention provides an apparatus for transporting golf carts and the like while simultaneously hauling a conventional-type load in an over-the-road wheeled vehicle. The apparatus includes a generally box-like main storage compartment having a floor of generally parallelogram configuration, a support shelf, and a control system. The compartment includes a pair of spaced apart, generally parallel, generally rigid side wall members, the side wall members being connected to the floor adjacent respective opposite edge portions thereof and extending substantially perpendicularly therefrom, and a covering supported on the side wall members in generally facing relation to the floor, the area of the covering bounded by the side wall members defining,the ceiling of the main storage compartment, a front end wall formed at one end of the main storage compartment and an access opening formed at the other end of the main storage compartment.

The support shelf is disposed interiorly of the main storage compartment and is movable therein. The shelf includes opposite sides adjacent to the side wall members of the compartment, a front end and a back end, and provides a substantially rigid surface for supporting a plurality of the golf carts or the like thereon. The width of the support shelf conforms substantially to the width of the ceiling. In one preferred embodiment, the length of the support shelf extends through substantially one-third of the compartment with the front end of the shelf being positioned approximately two-thirds from the front end of the compartment and the back end being positioned adjacent to the access opening. Thus, the remaining portion extending from two-thirds from the front end to the front end of the main compartment is empty and may be used for hauling conventional-type loads or for such other purposes as desired. It is a feature of the present invention that an operator may build his own deck or otherwise configure the portion of the compartment which is not occupied by the shelf and that the full vertical capacity of such portion is available for use. While the preferred support shelf extends through approximately one-third of the compartment, it will be understood that the support shelf in accordance with the present invention may extend through any portion of the length of the compartment thereby increasing or decreasing the number of golf carts and the like which may be transported and accordingly decreasing or increasing the size of the remaining portion of the compartment available for other uses.

In one preferred embodiment, the front end of the support shelf is connected by a mounting means to the side wall members at the midsection of the compartment for supporting the shelf at a predetermined intermediate height between the floor and the ceiling. The mounting means includes a shelf supporting means extending vertically on each side wall member and a pivoting means at the front end of the support shelf in communication with the shelf supporting means. The pivoting means of one preferred embodiment is a concentric rod assembly which includes a hollow, substantially cylindrical outer member extending substantially across the width of the shelf at the front end and having opposite open ends, and a substantially cylindrical inner member positioned within the outer member having opposite ends which extend outward through the open ends of the outer member. The outer member is rotatable relative to the inner member such that the inner member defines a nonrotatable movement axis for movement of the shelf between its transport and loading positions.

The preferred shelf supporting means is a carrier plate mounted to each side wall member and being positioned across from and in alignment with one another on each side wall member. The plate preferably extends vertically from the ceiling to the floor and includes a slot extending from the ceiling to a predetermined intermediate point approximately half-way between the floor and the ceiling and being adapted to receive the ends of the inner member. The ends of the inner member extend through the slot and into the cavity and move vertically along the slot in response to the raising and lowering of the shelf between its transport and storage positions.

The present invention preferably includes a stabilizing means for minimizing the movement of the front end of the shelf when the vehicle is in motion. In one preferred embodiment, the stabilizing means includes a flange at each end of the outer and inner members of the rod assembly with the plate being positioned between the flanges of the members. Each flange extends outward beyond the width of the slot in the plate to minimize the side-to-side movement of the rod assembly. In addition, the flange of the inner member includes a substantially flat portion which is adapted to abut a substantially flat element to prevent the inner member from rotating in response to the rotation of the outer member during the movement of the shelf between its transport and loading positions and when the shelf is in its transport position. In one preferred embodiment, the substantially flat element is a ledge positioned within the cavity between the wall member and the plate which extends from the wall to the plate to engage the flat portion of the flange, thereby preventing the inner member from rotating.

In one preferred embodiment, an arrangement for selective movement of the support shelf includes a control system which selectively moves the shelf toward and away from the ceiling, and selectively moves the front end of the shelf relative to the back end of the shelf about the movement axis. The control system is operable to move the shelf to its loading position for loading the golf carts and the like thereon at which the shelf is disposed generally downwardly inclined from the intermediate position between the floor and the ceiling toward the floor. Additionally, the control system is operable to move the shelf between its transport position for supporting the golf carts and the like during transport thereof at which the shelf is disposed intermediate the ceiling and the floor and generally parallel thereto, and its storage position at which the shelf is disposed in substantially flush relation with a selected one of the ceiling or the floor. One preferred embodiment of the present invention further includes a selectively operable adjustment device in communication with the control system for maintaining proper alignment of the shelf.

According to another feature of the present invention, one preferred embodiment includes a first ramp, an assembly for selectively interconnecting the first ramp to the over-the-road vehicle for movement of the first ramp between an intermediate position in which it is supported above the road, and a loading position in which it provides support for movements of loads thereover between the road (or another load originating location) and the floor, and an assembly for detachably mounting the first ramp means to the over-the-road vehicle. The detachable mounting assembly mounts the first ramp for movement of the first ramp about an axis generally perpendicular to the floor between its intermediate position and an access position for permitting movement of loads there past and into or out of the vehicle.

Preferably, the apparatus includes a second ramp, an assembly for selectively interconnecting the second ramp to the over-the-road vehicle for movement of the second ramp independently of the first ramp between an intermediate position in which the second ramp is supported above the road and a loading position in which the second ramp provides support for movement of the loads thereover, and an assembly for detachably mounting the second ramp means to the over-the-road vehicle for movement independent of the first ramp about an axis generally perpendicular to the floor, the second ramp being movable between the associated intermediate position and an access position for permitting movement therepast and into or out of the vehicle.

Other features, characteristics and advantages are described below with reference to the accompanying drawings and/or will be apparent therefrom to persons of skill in the art.

DESCRIPTION OF THE PREFERRED EMBODIMENT

Figure 1:
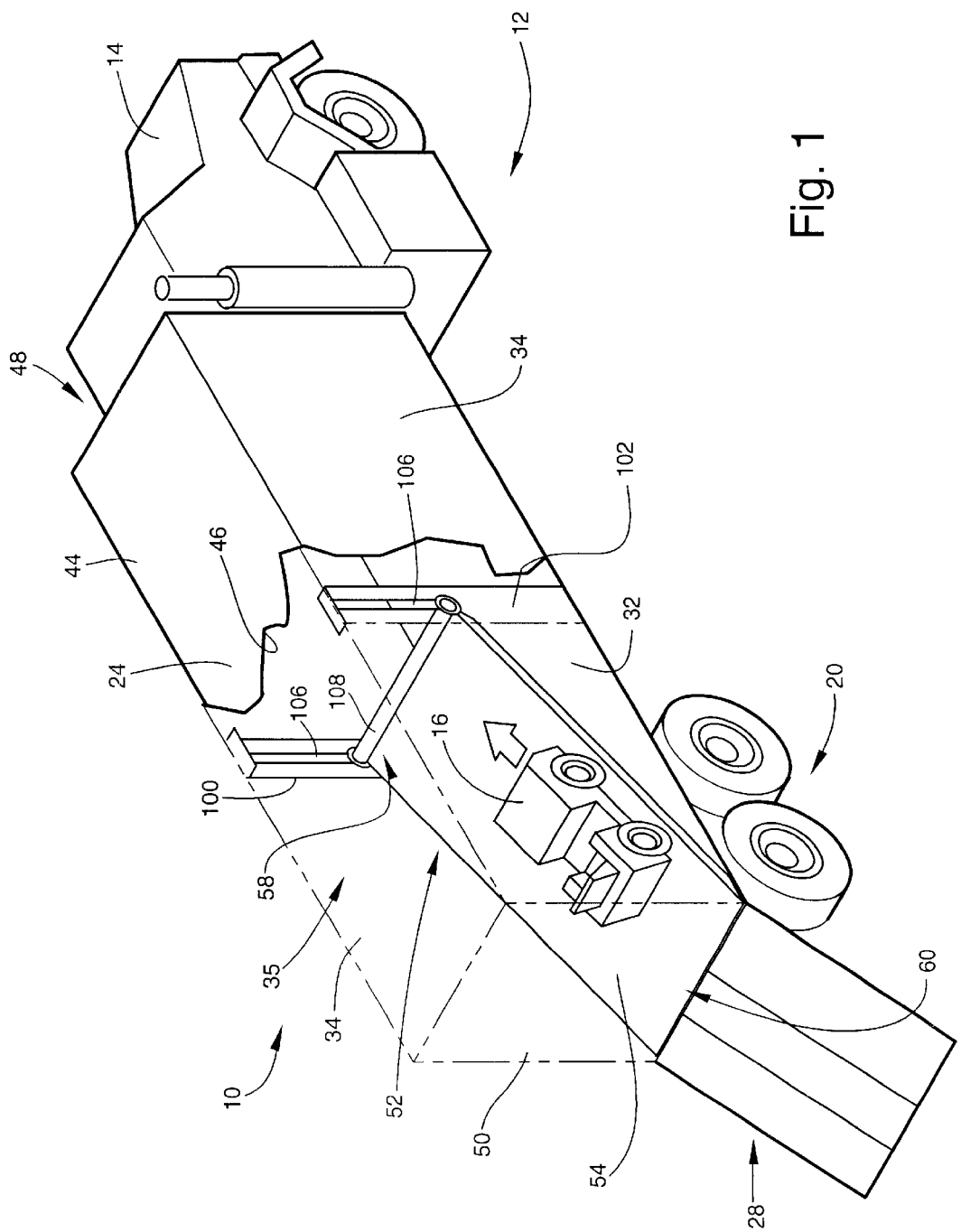
FIG. 1 is a perspective view in partial section of one preferred embodiment of the transport apparatus of the present invention.

Referring now to the accompanying drawings and initially to FIG. 1, FIG. 1 illustrates an overview of a trailer 10 of a tractor-trailer combination 12. The tractor 14 of the tractor-trailer combination 12 is a conventional motorized tractor having a "fifth wheel" for coupling the trailer 10 thereto for articulated combined movement of the tractor and trailer along a road of the type described in my U.S. Pat. No. 4,966,510 which is incorporated by reference hereto. As in U.S. my Pat. No. 4,966,510, the trailer 10 includes a chassis, a pair of wheel assemblies 20 mounted to the underside of the chassis for rollingly supporting the trailer 10 on a road surface, a fifth wheel coupling assembly (not shown) for coupling the trailer 10 to the fifth wheel of the tractor 14, a main storage unit 24 and a main loading ramp unit 28. The chassis, the wheel assemblies 20 and the fifth wheel coupling assembly of the trailer are all of conventional construction as used in many commercially available tractor-trailer combinations.

The main storage unit 24 is fixedly mounted to, and laterally centered on, the chassis. The main storage loading ramp unit 28 is mounted to the main storage unit 24 and the main loading ramp unit 28 permits loading and unloading of the golf carts 16 and the standard loads into the main storage unit 24. The main storage unit 24 includes a structure for maintaining the golf carts 16 loaded therein in fixed relative positions, and a structure to protect the carts 16 and standard loads when the trailer 10 is both parked and traveling over the road. As a result, the golf carts 16 and the like, as well as the conventional-type loads stored therein, can be simultaneously transported, and reliably and safely delivered to various sites to which the tractor-trailer combination 12 travels.

As shown in FIG. 1, the trailer 10 of the present invention is specifically adapted to be converted between a special load configuration in which it protects and supports in one portion of the trailer 10 a plurality of small wheeled vehicles in predetermined relative positions, such as a plurality of self propelled golf carts 16, for over-the-road travel, while simultaneously providing in the remaining portion, the full capacity of the trailer for other uses, and further providing a conventional load configuration in which a standard load may be hauled in the same manner as a conventional semi-trailer. A feature of the present invention is that the special load configuration occupies only a portion of the compartment of the trailer thereby reducing the cost of including the special configuration therein and allowing the operator to construct a deck in or otherwise utilize the fall capacity of the remaining portion of the compartment.

The main storage unit 24 is of generally box-like configuration with a longitudinal extent about six times greater than its lateral extent and a height extent about the same order of magnitude as its lateral extent. The floor 32 is laterally centered on the chassis, and fixedly mounted thereto by conventional means (not shown) such as by welding or other suitable attachment means. The floor 32 supports the golf carts 16 and conventional loads during loading and unloading, and during the transport and storage of those items. The floor 32 is preferably composed of tightly jointed wooden floor boards or other suitable means which present a relatively smooth, impermeable surface of sufficient strength and rigidity to resist deflection during the movement and storage of the golf carts 16 and conventional loads thereon.

Figure 2:
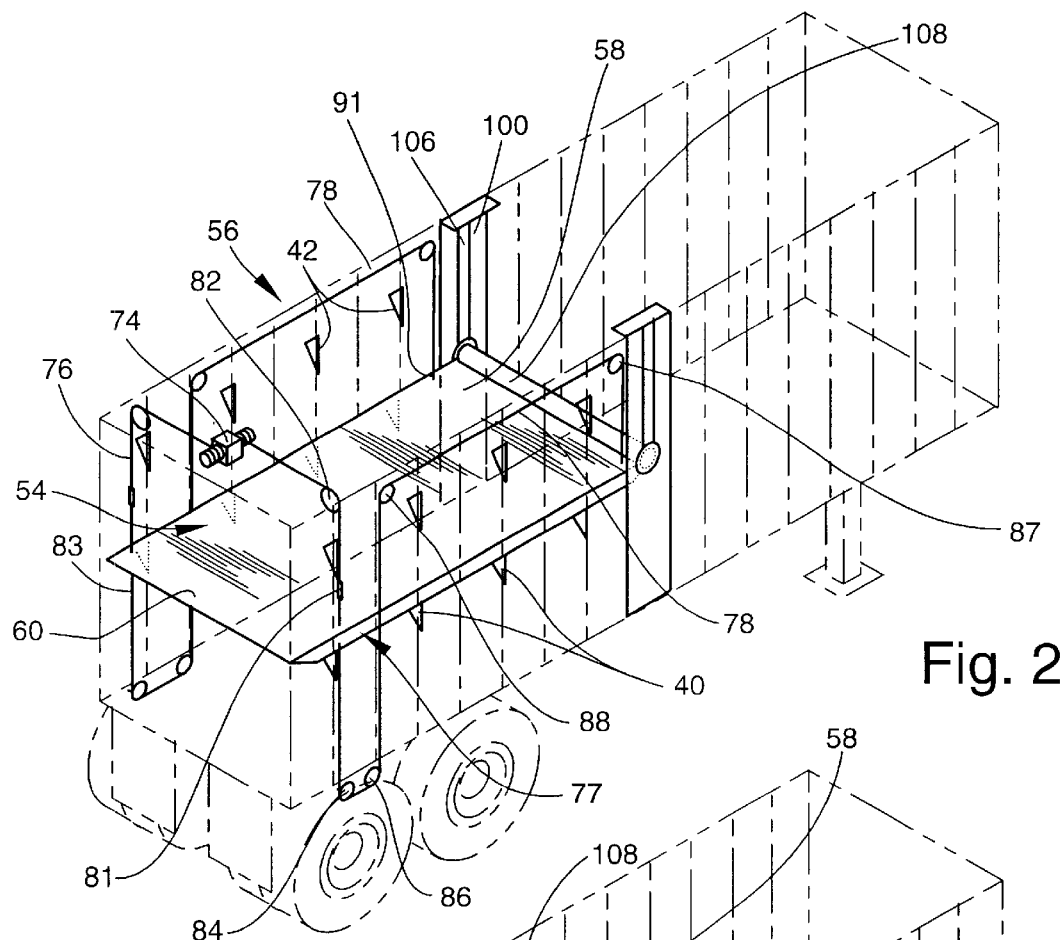
FIG. 2 is a diagrammatic view of the transport apparatus shown in FIG. 1, illustrating the support shelf in the transport position.
Figure 3:
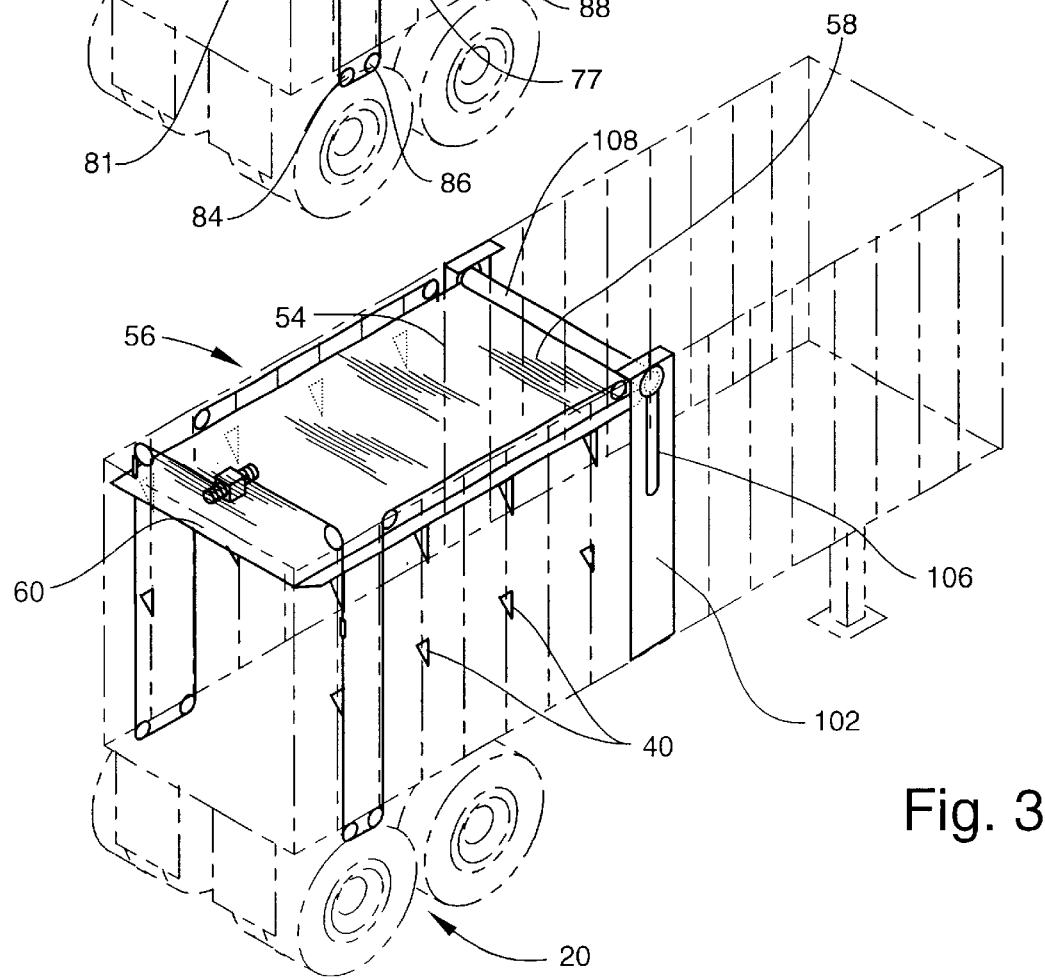
FIG. 3 is a diagrammatic view of the transport apparatus shown in FIG. 1, illustrating the support deck in the storage position.
Figure 4:
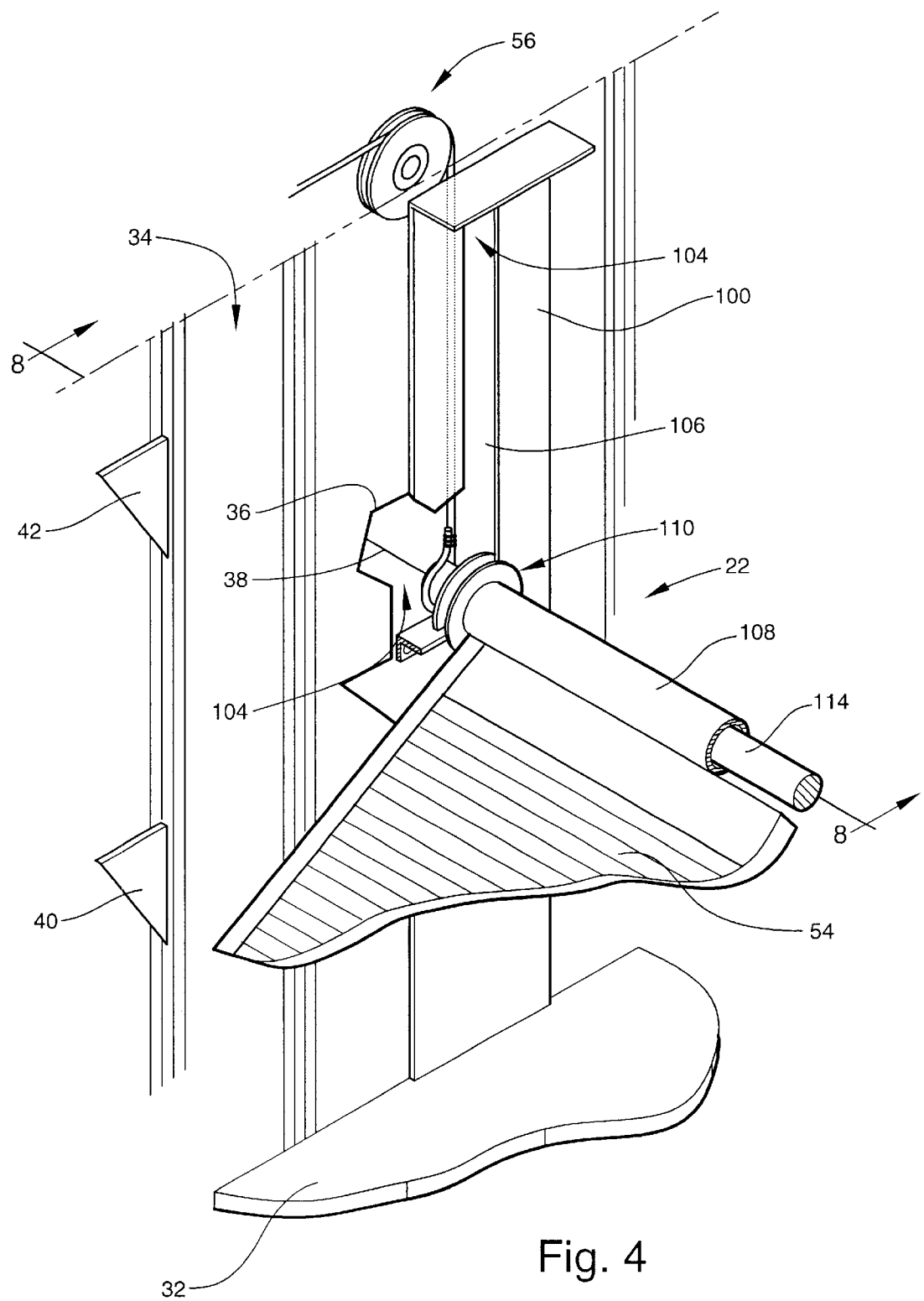
FIG. 4 is a partial perspective view in partial section of the carrier plate and rod assembly of the transport apparatus shown in FIG. 1, showing the support shelf in the loading position.

As best seen in FIGS. 1–3, the main storage unit 24 additionally includes a pair of spaced apart, flat side wall members 34 arranged parallel to one another, a front end wall member 48 which extends between the wall members at one end thereof, an access opening 50 formed at the other end and the main ramp unit 28 which extends between the side walls 34 at the access opening end. Each wall member 34 is mounted to the floor 32 along a respective longitudinal edge thereof and extends generally perpendicularly with respect to the floor 32. As best seen in FIG. 4, the wall members 34 are formed of conventional over-the-road trailer walls specially adapted for use with the present apparatus. Specifically, each wall member 34 includes an outer, relatively thin metal or aluminum skin 36 fastened to a channeled, generally rigid and self standing metal frame 38. A roof member 44 constructed of a metal base frame covered on both sides by thin metal coverings is mounted by welding to the top edges of the wall members 34 and the front wall member 48, with the inwardly facing surface of the metal skin of the roof member 44 defining a ceiling 46 in generally facing relation to the floor 32.

The access opening 50 is sealed by a pair of doors (not shown) hingedly mounted to a vertical edge portion of a respective one of the side wall members 34 and each having a width approximately equal to one-half the lateral extent of the main storage unit 24, whereby the pair of doors substantially completely seal the access opening 50 when pivoted about their respective hinges to their closed position in generally coplanar relationship with one another. The doors are formed similarly to conventional over-the-road trailer doors and include a metal skin fastened to opposite sides of an internal metal framework so as to enclose the metal framework therein and additionally include conventional locking devices for engaging the floor 32 and the roof member 44 to retain the doors in their closed position. Thus, the floor 32, the side wall members 34, the front wall 48, the doors and the ceiling 46 define a substantially enclosed compartment which provides good protection against weather elements and the like for the golf carts 16 and any conventional loads stored therein.

In order to provide a two-tier special configuration for supporting golf carts and the like in a portion of a combination tractor-trailer, the main storage unit 24 further includes, as best seen in FIGS. 1–3, an intermediate support assembly 52 having a selectively movable shelf 54 for supporting a plurality of the golf carts 16 thereon in a mid-position intermediate the ceiling 46 and the floor 32, and a shelf positioning assembly 56 for selectively moving the shelf 54 between a loading/unloading position, a support or transport position and a disengaged or storage position. The shelf 54 includes a front end 58 and a back end 60, and is of generally rectangular configuration with a longitudinal extent preferably substantially equal to one-third the longitudinal extent of the compartment of the main storage unit 24. As best seen in FIGS. 1–3, the front end 58 of the shelf 54 is preferably positioned at approximately two-thirds from the front of the compartment 35 with the back end 60 being positioned adjacent to the access opening 50 and fractionally less than the lateral extent of the compartment of the main storage unit.

Figure 7:
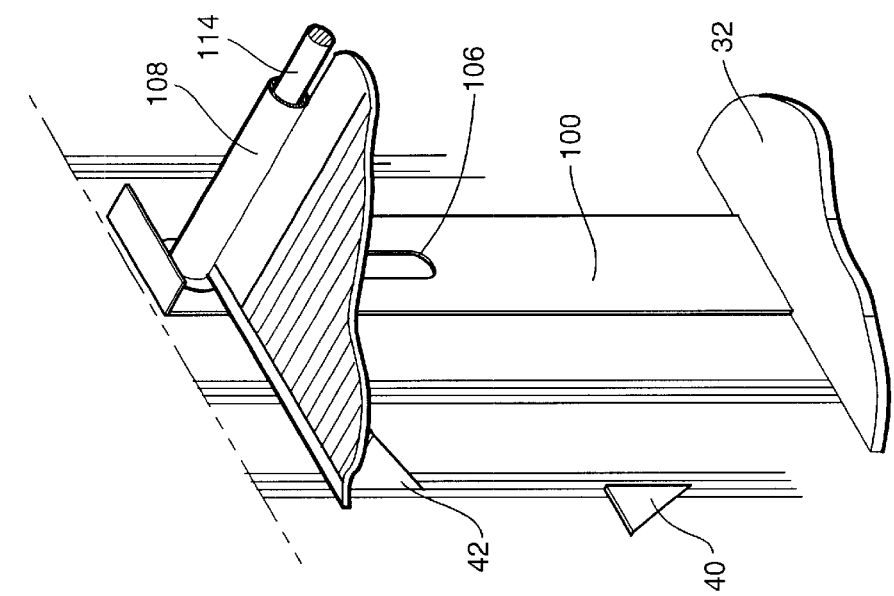
FIG. 7 is a partial perspective view in partial section of the carrier plate and rod assembly of the transport apparatus shown in FIG. 1, showing the support shelf in the storage position.
Figure 6:
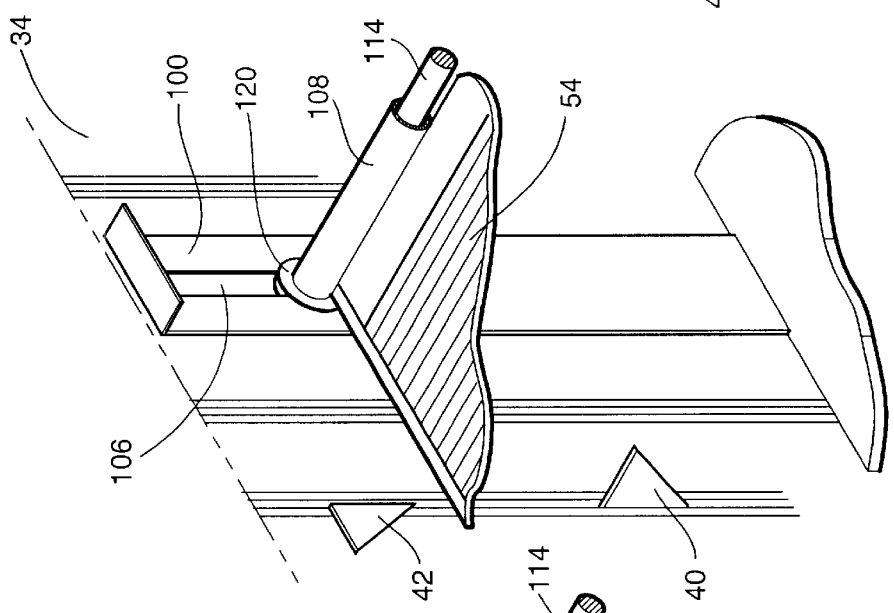
FIG. 6 is a partial perspective view in partial section of the carrier plate and rod assembly of the transport apparatus shown in FIG. 1, showing the support shelf between the transport position and the storage position.
Figure 5:
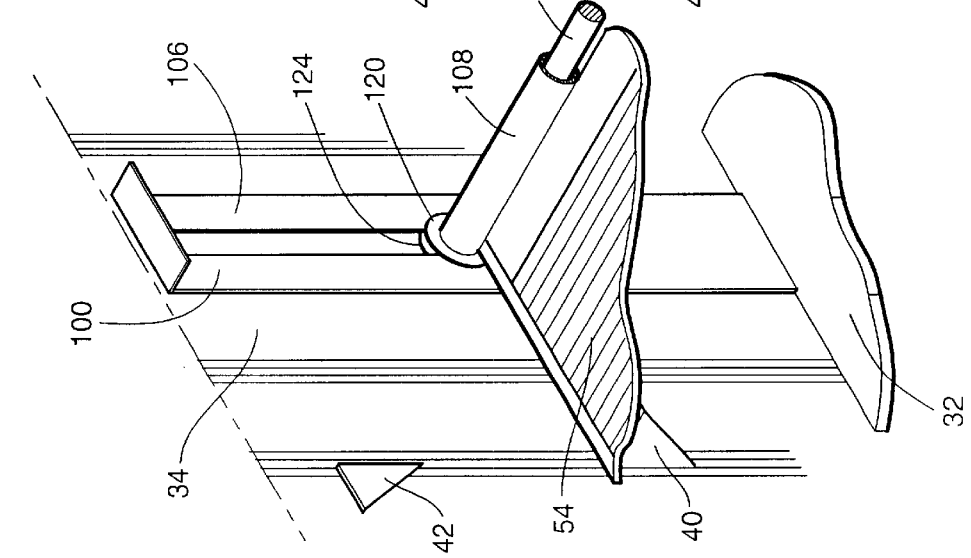
FIG. 5 is a partial perspective view in partial section of the carrier plate and rod assembly of the transport apparatus shown in FIG. 1, showing the support shelf in the transport position.

The shelf positioning assembly 56 selectively moves the shelf 54 between a loading/unloading position to effect loading of the golf carts 16 and the like, a support position, as shown in FIG. 2, to support the golf carts 16 and the like during transport and storage of the carts, and a disengaged position for the storing the shelf 54 in a non-interfering location for loading, unloading and transport of conventional-type loads in the portion of the compartment in which the shelf 54 is located. Because the shelf 54 extends through only a portion of the compartment and does not extend through the full longitudinal extent of the trailer, the full capacity of a remaining portion of the compartment is available both during the transport of the golf carts 16 and the like, and on the return trip. To provide additional support of the shelf 54 in its transport and storage positions, the present invention includes a first plurality of brackets 40 on side wall members 34 positioned to support the shelf 54 in its transport position (see FIG. 5), and a second plurality of brackets 42 on side wall members 34 positioned to support the shelf in its storage position (see FIG. 7). Both the first and second plurality of brackets 40, 42 are independently moveable between a first disposition in which they extend generally perpendicularly to the respective side wall member 34 and a second disposition in which they are substantially flush with the respective side wall member 34. In FIGS. 5–7, the brackets 40, 42 are shown in both the first and second dispositions.

As best seen in FIGS. 2 and 3, the shelf unit positioning assembly 56 includes a cable and winch system having a reversible winch 74 fixedly mounted to the rear center of the ceiling 46. The cables of the cable and winch system include a pair of drive cables 76 and a pair of trunk cables 78. Each drive cable 76 has one end mounted to the back end 60 of the shelf 54 and its other end mounted to the rotating shaft of the winch 74. The drive cables 76 are mounted to the winch 74 such that they are simultaneously wound or unwound during rotation of the winch shaft. Each drive cable 76 extends from the winch 74 in a direction generally parallel to the ceiling 46 and laterally toward a respective one of the side wall members 34, around a guide pulley 82 mounted to the respective side wall member 34 and extends downwardly parallel to the respective side wall member 34 to terminate at a clevis pin assembly 81 which selectively connects it to the back end 60. The drive cables 76 and the trunk cables 78 are of conventional twisted steel cable or other suitable cable having sufficient tensile strength and durability to support the retractable shelf 54 during repeated raising and lowering of the retractable shelf 54 as well as during movement of the back end 60 of the shelf 54 relative to the front end 58.

As seen in FIG. 2, each trunk cable 78 is normally secured to the back end 60 by a hitch pin assembly 83 to the underside of the back frame portion 60 opposite the clevis pin assembly 81. Each trunk cable 78 extends downwardly generally parallel to the respective side wall member 34 there adjacent, is trained around a pair of guide pulleys 84 and 86, or a single pulley, and mounted to the chassis. Each trunk cable 78 then extends generally parallel to the side wall member 34 and is trained around a third guide pulley 88 and extends horizontally generally parallel to the respective side wall member 34 and the ceiling 46 to a fourth guide pulley 87. Thereafter, each trunk cable 78 extends to a connecting assembly 91 which connects it to the front end 58. The guide pulley 87 is mounted to each side wall member 34. The guide pulley 87 is positioned relative to the connections of the trunk cable 78 such that movement of the trunk cable 78 produces movement over the guide pulley 87.

FIGS. 4–8 illustrate one preferred embodiment of a feature of the present invention which provides a mounting means for connecting the shelf 54 to the side wall members 34 at the midsection of the compartment 35 and supporting the shelf 54 for movement between the loading, transport and storage positions. The mounting means is a plate and rod assembly 22. which includes a pair of rigid, substantially flat, plate members 100, 102 and a pair of concentric rod members supported by the plate members. As best seen in FIGS. 1–3, the plate members 100, 102 are positioned across from one another and mounted on each side wall member 34, extending vertically from the ceiling to the floor. Between the metal frame of the side wall member 34 and each plate member 100, 102, a cavity 104 is formed in which the rod assembly 22 can be positioned. Each plate member 100, 102 has a inner surface 101 which faces the interior of the compartment 35 and an outer surface 103 which faces the cavity 104. As shown in FIGS. 1–7, each plate member 100, 102 includes a slot 106 extending from the ceiling to a predetermined intermediate mid-point approximately half-way between the floor and the ceiling, at which mid-point the shelf 54 is aligned in co-planar relation with, in its transport position.

Figure 8:
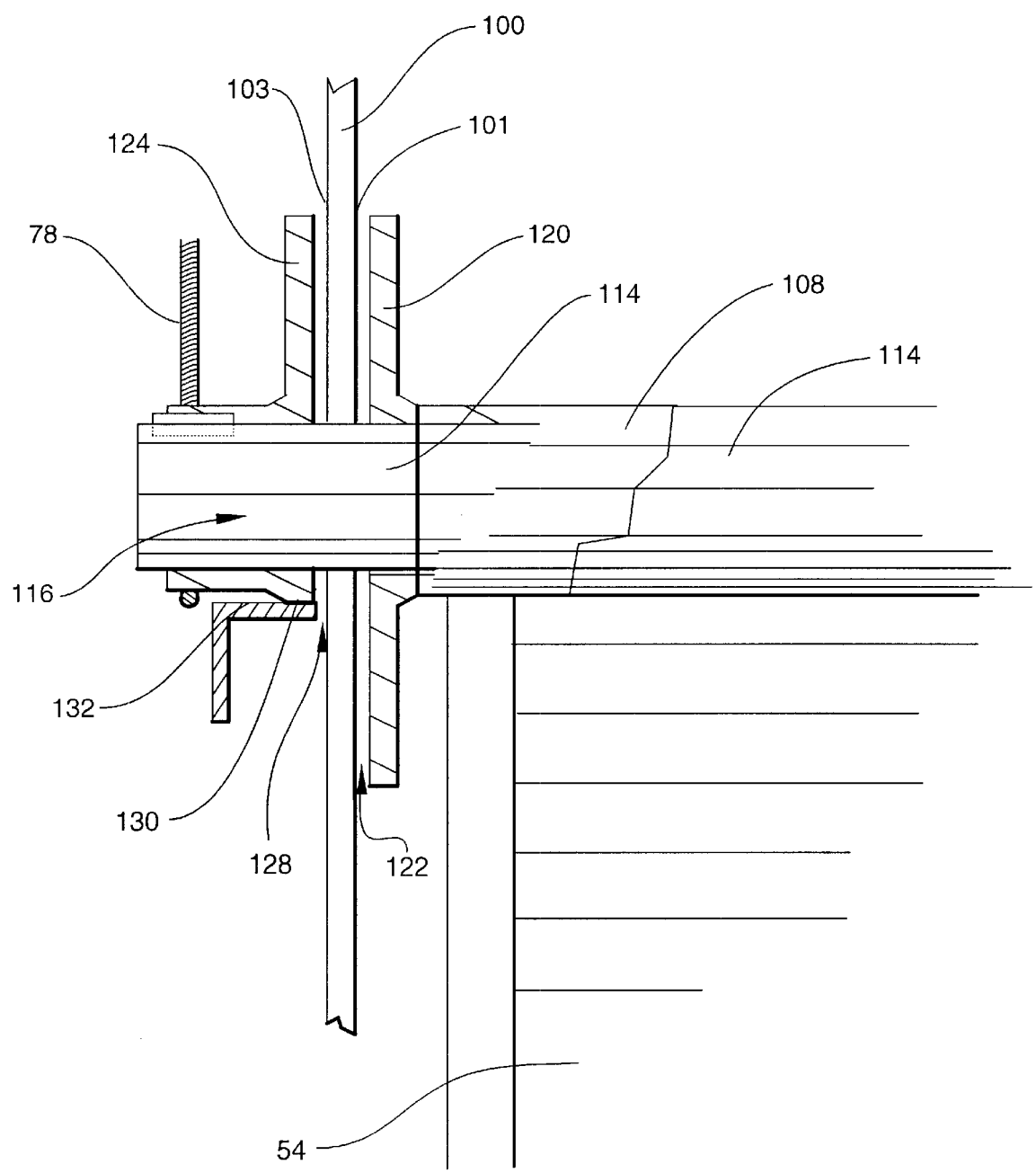
FIG. 8 is a cross-sectional view of the carrier plate and rod assembly taken along lines 8—8 of FIG. 4.

The plate and rod assembly 22 of one preferred embodiment includes a hollow, substantially cylindrical outer member 108 which extends substantially across the width of the shelf at the front end 58 of the shelf 54 and has opposite open ends 110 positioned adjacent to the slot 106 in each plate member 100, 102. As shown in FIGS. 4–8, the assembly also includes a as substantially cylindrical inner member 114 extending through the outer member 108 and having a length exceeding the length of the outer member 108 such that opposite ends 116 of the inner member 114 extend outwardly from the opposite open ends 110 of the outer member 108. As best seen in FIG. 8, the slot 106 is formed in each plate member 100, 102 and is adapted to receive the opposite ends 116 of the inner member which extends therethrough into the cavity 104 and is engaged by the cable 78 for movement of the shelf 54 between its transport and storage positions. In one preferred embodiment, the outer member 108 is rotatable relative to the inner member 114 and the inner member 114 is specifically designed to define a non-rotatable horizontal movement axis for pivoting the shelf 54 between its loading and transport positions. Thus, the plate and rod assembly 22 connects the shelf 54 to the inner wall members at the midsection of the compartment for securely supporting the shelf in its transport and storage positions and providing for the pivotal movement of the shelf between its loading and transport positions.

In one preferred embodiment, the plate and rod assembly 22 of the present invention includes a stabilizing means for minimizing the movement of the front end 58 of the shelf 54 when the vehicle is in motion which includes an enlarged portion at each end 116 and 110 of the inner and outer members 114, 108, respectively, of the plate and rod assembly 22 surrounding each plate member 100, 102 therebetween. As best seen in FIG. 8, the enlarged portions include a first circular plate 120 extending outward from each open end 110 of the outer member 108 and attached to inner member 114. In one preferred embodiment, the circular plate 120 is integral with the outer member 108. The first circular plate 120 has a diameter greater than the width of the slot 106 and is positioned closely adjacent to the inner surface 101 of each plate member 100, 102 with a small clearance 122 therebetween for allowing vertical movement of the inner member 114 within the slot 106 while minimizing the movement of the inner and outer members 114, 108 toward the adjacent side wall members 34. In addition, the enlarged portions include a second, substantially circular plate 124 attached to each end of the inner member 114. The second circular plate 124 extends outward from the opposite ends 116 of the inner member 114 and in one preferred embodiment, is fixedly secured to the ends of the inner member 114. The second circular plate 124 has a diameter greater than the width of the slot 106 and is positioned adjacent to the outer surface of each plate member 100, 102 with a small clearance 128 therebetween for allowing vertical movement of the rod assembly within the slot 106 while minimizing the movement of the inner and outer members 114, 108 toward the interior of the compartment 35. Thus, with the first and second circular plates 120, 124 positioned closely adjacent to and on either side of the plate members 100, 102 the side-to-side movement of the shelf 54 is minimized for stabilizing the shelf.

In one preferred embodiment, additional stabilizing means are provided for preventing the inner member 114 from rotating in response to the rotational movement of the outer member 108 when the shelf 54 is pivoted between its loading and transport positions. As illustrated in FIG. 8, the additional stabilizing means includes adapting the second circular plate 124 to include a substantially flat portion 130 whereby the circular plate 124 has a substantially semi-circular shape. As shown in FIG. 8, a substantially flat element or ledge 132 is positioned within the cavity 104 to abut the substantially flat portion 130 of the second circular plate 124 when the front end 58 of the shelf 54 is located at the mid-point between the ceiling 46 and the floor 32 in its loading and transport positions. Thus, as the shelf 54 is moved between its loading and transport positions and the outer member 108 rotates relative to the inner member 114, the positioning of the flat portion 130 against the ledge 132, prevents the inner member 114 from rotating.

Figure 2A:
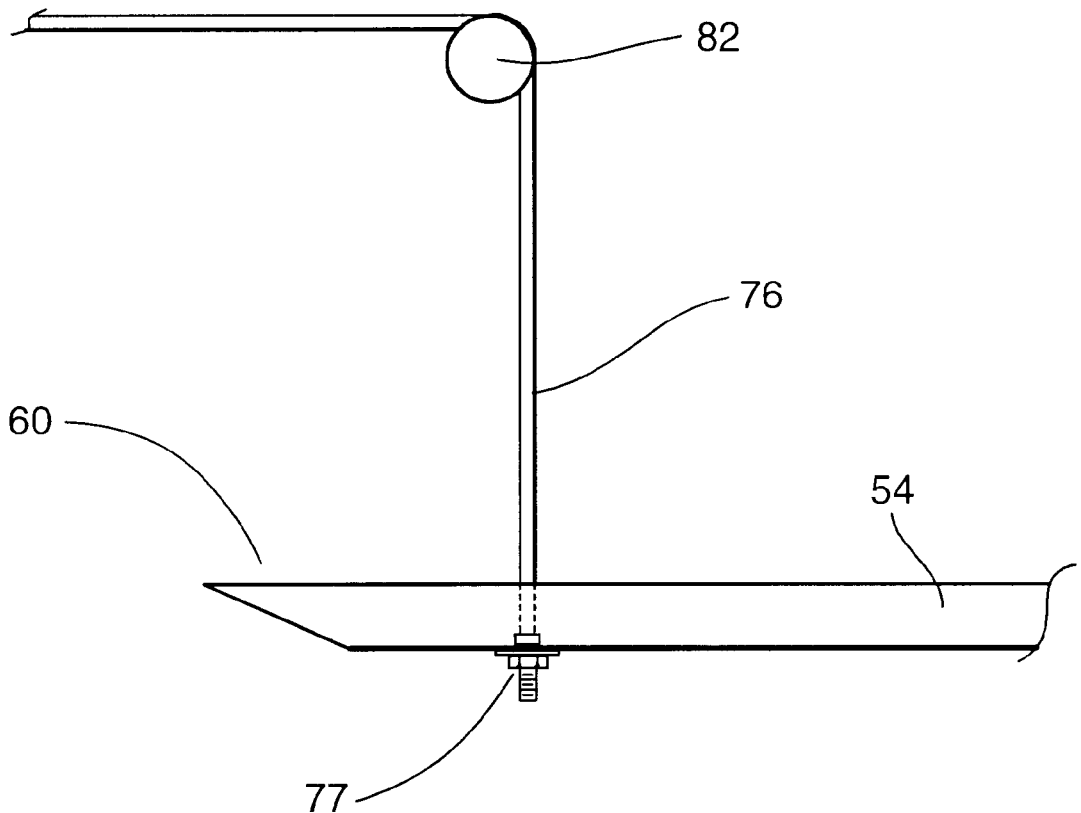
FIG. 2A is an enlarged, partial side view illustrating the adjustment device.

As shown in FIGS. 1 and 4, in its loading position, the plate and rod assembly 22 permits. the shelf 54 to be pivoted downward from the mid-point at which the front end 58 of the shelf is supported by the plate and rod assembly 22 with the back end 60 supported by the floor 32. FIGS. 2 and 5 illustrate the shelf 54 in its transport position in which the back end 60 of the shelf is aligned in co-planar relation with the front end 58 of the shelf and is supported on the brackets 40. To raise the shelf 54 from its transport position to its stored position in which it is substantially flush with the ceiling 46 and supported by brackets 42 (as shown in FIGS. 3 and 7), the operator need only operate the winch 74, (which can be operated, for example, by means of a hand held remote unit RU-1) to wind the drive cables 76 onto the winch. As can be understood, the winding of the drive cables 76 causes the back end 60 of the shelf 54 to be raised in a generally horizontal manner by the drive cables 76 and the trunk cable 78 connected thereto, and causes the front end 58 of the shelf 54 to be simultaneously raised in a generally horizontal manner by the trunk cables 78 connected thereto, such that the shelf 54 is raised horizontally (see FIG. 6) from its transport to its storage position. In addition, the present invention preferably includes an adjustment device 77 for maintaining proper alignment of the shelf 54. As best seen in FIG. 2A, the adjustment device 77 is an element with screw threads at one end and is attached to the drive cable 76. In use, the device 77 is turned to adjust the length of the cable for aligning the shelf 54.

The operation of the present invention typically begins with the performance of a pre-travel inspection including checking the tire pressure and visually inspecting the tires for deficiencies, inspecting all lights, brakes, oil levels in tire hubs and landing gear operation. The trailer 10 is prepared for freight by first establishing a safety perimeter at the rear of the trailer to prevent bystanders from entering this area while golf carts 16 and the like are loaded into a portion of the compartment 35. The remaining portion of the compartment may be built out by the operator to include a standard deck for hauling conventional-type loads or otherwise utilized, as desired, by the operator. Prior to loading the golf carts 16 and the like on the shelf 54, this portion of the compartment is loaded. Next, the ramp unit 28 is assembled to provide a surface which, in cooperation with the shelf 54 in its transport position, provides a surface having a generally constant slope for smooth loading and unloading of the golf carts 16 and the like between the road and the intermediate support assembly 52. In the preferred embodiment, the ramp unit is constructed of four pieces.

Assuming the shelf 54 is initially disposed in its storage position (shown in FIG. 3) in which the shelf is adjacent to the ceiling 46 supported by brackets 42, the shelf is raised slightly above the brackets 42 to allow the operator to pivot the brackets 42 into the second disposition. The brackets 40 nearest the access opening 50 remain positioned in the second disposition to permit the back end 60 of the shelf 54 to cantilever to the floor 32. The winch 74 is activated to lower the shelf 54 from its storage position to its transport position. Once the shelf 54 has been lowered to its transport position, the weight of the shelf exerts a downward force on the drive cables 76 such that the shelf begins to cantilever to the floor 32. Then, the operator manipulates the hitch pin assemblies 83 to disconnect the trunk cables 78 from the bottom of the back portion 60. Thereafter, continued unwinding of the drive cables 76 from the winch 74 permits the back end 60 of the shelf 54 which is adjacent the rear of the trailer 10 to drop toward the floor 32 while the front end 58 of the shelf 54 pivots about the inner member 114 of the rod assembly. When back end 60 comes to rest on the floor 32, the shelf 54 presents an upwardly inclined surface extending from adjacent the top of the ramp unit 28 to the front end 58 of the shelf 54. Thus, the golf carts 16 and the like can be individually driven up the ramp 28 and onto shelf 54 for parking thereon.

Once the inclined shelf 54 is loaded with its complement of the golf carts 16 and the like, the operator activates the winch 74 to wind the drive cables 76 thereon to raise the back end 60 to its horizontal, generally co-planar disposition with the front end 58 whereby the shelf 54 is in its transport position between the floor and the ceiling and generally parallel thereto. The floor 32 can then be loaded with a complement of the additional golf carts 16 and the like, using the deployed ramp unit 28. To relieve the drive cables 76 and the trunk cable 78 of the weight of the back portion 60 with its complement of golf carts and the like parked thereon, and to enhance the safety of the trailer 10, the operator then pivots the brackets 40 to perpendicular orientations with respect to the side wall members 34 to support the shelf 54 thereon.

Once at its destination, the trailer 10 is unloaded following a similar procedure. First, the ramp unit 28 is assembled and the golf carts 16 and the like parked on the floor of the trailer 10 are driven down the ramp unit 28 onto the road. Next, the shelf 54 is raised slightly above the support brackets 40 to allow the operator to pivot the brackets 40 to the second disposition flush with the respective side wall member 34. Then, the operator activates the winch 74 to unwind the drive cables 76, whereby the front end 58 pivots about the inner member 114 until its rear edge comes to rest on the floor 32. To move the shelf 54 to its storage position, the shelf 54 is raised to its transport position and the trunk cables are reconnected to the back end 60 with the hitch pin assemblies 83. The winch 74 is then activated to raise the shelf 54 to the ceiling slightly above the brackets 42. The operator then moves the brackets 42 to the first disposition and the shelf 54 is lowered to its storage position supported by the brackets 42.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, varations, modifications and equivalent arrangements, the present invention being limited only by the appended hereto and the equivalents thereof.

What is claimed is:

1. An apparatus for storing golf carts vehicles and specialized loads in generally fixed positions relative to one another during transport of the stored vehicles by a much larger over-the-road wheeled vehicle while simultaneously storing conventional-type loads for transport therein, said apparatus comprising:
    a generally box-like main storage compartment having a floor of generally parallelogram configuration, a pair of spaced apart, generally parallel generally rigid wall members, said wall members being connected to said floor adjacent respective opposite edge portions thereof and extending substantially perpendicularly therefrom, and a cover supported on said wall members in generally facing relation to said floor, the area of said cover bounded by said wall members defining the ceiling of said main storage compartment, a front end formed at one end of said main storage compartment and an access opening formed at one end of said main storage compartment;
    a shelf disposed interiorly of said main storage compartment and movable therein, said shelf having opposite sides adjacent to said wall members, a front end and a back end, and having a substantially rigid surface for supporting a plurality of golf carts, vehicles and specialized loads, said shelf substantially conforming to the width of said ceiling and having a length substantially less than the length of said wall members;
    control means for selectively moving said shelf toward and away from said ceiling, and for selectively moving said shelf about a nonrotatable movement axis thereof, said control means being operable to move said shelf between:
        a loading position for loading the golf carts, vehicles and specialized loads thereon at which said front end of said shelf is disposed intermediate said ceiling and said floor, and said back end is disposed adjacent to said floor, said shelf being disposed generally downwardly inclined from said front end of said shelf toward said floor,
        a transport position for supporting the golf carts, vehicles and specialized loads during transport thereof at which said shelf is supported and disposed intermediate said ceiling and said floor and generally parallel thereto, and
        a storage position at which said shelf is disposed in substantially flush relation with a selected one of said ceiling or said floor, whereby said compartment can be used to store bulk material in the portion thereof not occupied by said shelf and store golf carts, vehicles and specialized loads on the portion thereof occupied by said shelf; and
    mounting means for connecting said shelf to said wall members, said mounting means including shelf supporting means and a pivoting means on said front end of said shelf, said pivoting means in communication with said shelf supporting means for providing for relative movement of said shelf about an axis generally transverse to said wall members, and wherein said pivoting means includes a rod assembly having a hollow, substantially cylindrical outer member, said outer member extending substantially across the width of said front end of said shelf and having opposite open ends; and a substantially cylindrical inner member positioned within said outer member, said inner member having opposite ends extending outward through said open ends of said outer member, and wherein said inner member defines said nonrotatable movement a of said shelf, about which said outer member is rotatable relative to said inner member for pivotal movement of said shelf between said loading position and said transport position.

2. The apparatus of claim 1, wherein said mounting means further comprises a stabilizing means in communication with said pivoting means and said shelf supporting means for minimizing the movement of said shelf when said over-the-road vehicle is in motion.

3. The apparatus of claim 1, wherein said shelf supporting means comprises a pair of plates, each said plate being mounted to each wall member, said plates being positioned across from and in alignment with one another on each wall member and forming a cavity between each plate and said wall member, each said plate extending vertically from said ceiling to a predetermined intermediate point between said floor and said ceiling and each said plate further including a slot, said slot extending substantially the height of said plate and each said slot being adapted to receive said one end of said inner member, wherein each said inner member end extends through each said slot and into said cavity for vertical movement of said inner member ends along said slots in response to the raising and lowering of said shelf between said transport position and said storage position.

4. The apparatus of claim 3, wherein said stabilizing means includes a flange at each end of said outer and inner members of said rod assembly, said plate being positioned between said flanges of said inner and outer members and said flanges extending outward beyond the width of said slot on opposite sides of said plate thereby minimizing the side-to-side motion of said outer and inner members relative to said plate.

5. The apparatus of claim 4, wherein said flanges include a first circular portion extending outward from said open ends of said outer member and a second circular portion extending outward from said opposite ends of said inner member, said first and second circular portions being parellel to one another and to said wall members.

6. The apparatus of claim 4, wherein said stabilizing means further includes a substantially flat element fixedly positioned within said cavity and said flange of said inner member flier includes a substantially flat portion adapted to engage said flat element for preventing said inner member from rotating in response to the rotation of said outer member during the pivotal movement of said shelf between said loading position and said transport position.

7. The apparatus of claim 6, wherein said flat element includes a ledge extending within said cavity from each said wall member to each said plate and positioned to abut said flat portion of each said flange.

8. An apparatus for storing golf carts, vehicles and specialized loads in generally fixed positions relative to one another during transport of the stored vehicles by a much larger over-the road wheeled vehicle while simultaneously storing conventional-type loads for transport therein, said apparatus comprising:

a generally box-like main storage compartment having a floor of generally parallelogram configuration, a pair of spaced apart, generally parallel, generally rigid wall members, said wall members being connected to said floor adjacent respective opposite edge portions thereof and extending substantially perpendicularly therefrom, and a cover supported on said wall members in generally facing relation to said floor, the area of said cove bounded by said wall members defining the ceiling of said main storage compartment, a front end formed at one end of said main storage compartment and an access opening formed at one end of said main storage compartment;

a shelf disposed interiorly of said main storage compartment and movable therein, said shelf having opposite sides adjacent to said wall members, a front end and a back end, and hang a substantiality rigid surface for supporting a plurality of golf carts, vehicles and specialized loads, said shelf substantially conforming to the width of said vehicle and having a length substantially less than the length of said wall members;

control means for selectively moving said shelf toward and away from said ceiling, and for selectively moving said shelf about a movement axis thereof, wherein said movement axis is defined by substantially cylindrical inner member and is generally transverse to said wall members, said control means being operable to move said shelf between:

a loading position for loading the golf carts, vehicles and specialized loads thereon at which said front end of said shelf is disposed intermediate said ceiling and said floor and said back end is disposed adjacent to said floor, said shelf being disposed generally downwardly inclined from said front end of said shelf toward said floor, a transport position for supporting the golf cats, vehicles and specialized loads during transport thereof at which said shelf is supported and disposed intermediate said ceiling and said floor and generally parallel thereto, and a storage position at which said shelf is disposed in substantially flush relation with a selected one of said ceiling or said floor, whereby said compartment can be used to store bulk material in the portion thereof not occupied by said shelf and store golf carts, vehicles and specialized loads on the portion thereof occupied by said shelf; and mounting means for connecting said shelf to said wall members, said mounting means including shelf supporting means and providing for relative movement of said shelf about said movement axis wherein said shelf supporting means comprises a pair of plates each said plate being mounted to each wall member, said plates being positioned across from and in alignment with one another on each wall member and forming a cavity between each plate and said wall member, each said plate extending vertically from said ceiling to a predetermined intermediate point between said floor and said ceiling and each said plate further including a slot, said slot extending substantially the height of said plate and each said slot being adapted to receive an end of said inner member, wherein each said inner member end extends through each said slot and into said cavity for vertical movement of said inner member ends along said slot in response to the raising and lowering of said shelf between said transport position and said storage position.

\* \* \* \* \*